United States Patent [19]

Uemura

[11] 4,328,850
[45] May 11, 1982

[54] RADIAL TIRE FOR TRUCK AND BUS HAVING SPECIFIED TREAD TO TIRE WIDTH RATIO

[75] Inventor: Yukihisa Uemura, Nara, Japan

[73] Assignee: The Toyo Rubber Industry Co., Ltd., Osaka, Japan

[21] Appl. No.: 213,008

[22] Filed: Dec. 4, 1980

Related U.S. Application Data

[63] Continuation-in-part of Ser. No. 931,546, Aug. 7, 1978, abandoned.

[51] Int. Cl.³ .......................... B60C 3/00; B60C 9/08
[52] U.S. Cl. .......................... 152/209 R; 152/352 R; 152/359; 152/361 R
[58] Field of Search ............. 152/209, 352 R, 352 A, 152/353 R, 353 GG, 354 R, 354 RB, 355, 356, 357, 359, 361

[56] References Cited

U.S. PATENT DOCUMENTS

| | | | |
|---|---|---|---|
| 3,090,417 | 5/1963 | Spelman | 152/354 |
| 3,419,060 | 12/1968 | Goy | 152/359 |
| 3,638,706 | 2/1972 | Wilson et al. | 152/359 |
| 4,019,551 | 4/1977 | Kolowski | 152/354 |
| 4,037,637 | 7/1977 | Arimura et al. | 152/352 R |
| 4,082,132 | 4/1978 | Arai et al. | 152/361 R |
| 4,244,414 | 1/1981 | Uemura et al. | 152/359 |

Primary Examiner—John E. Kittle
Assistant Examiner—Lois E. Boland
Attorney, Agent, or Firm—Koda and Androlia

[57] ABSTRACT

A structure for a radial tire for trucks and buses having textile cords in its carcass ply layer and steel cords in its belt layer is disclosed. The tire of this invention has a tread angle within a certain range, which angle is taken such as to be constituted by a line directed from a width-end point of the tire to a width-end point of the tread and a line directed from the width-end point of the tread in the straight vertical direction. More specifically, the ratio of the width of the tread to the width of the tire is so arranged that the tread angle with full air pressure be 17°±3° and the difference between the tread angle with full air pressure and the tread angle with an air pressure of 0.5 kg/cm² be 3° or less.

1 Claim, 6 Drawing Figures

RADIAL TIRE FOR TRUCK AND BUS HAVING SPECIFIED TREAD TO TIRE WIDTH RATIO

CROSS REFERENCE TO RELATED APPLICATION

This is continuation-in-part application of Ser. No. 931,546 filed Aug. 7, 1978, now abandoned.

BACKGROUND OF THE INVENTION

1. Field of the Invention

This invention relates to a radial tire for trucks and buses, and more particularly to a radial tire for trucks and buses with textile cords in its carcass ply layer and steel cords in its belt layer.

2. Prior Art

It has been well known that the textile cords used in tires as a reinforcing element will be extended to an extent depending upon its material, treatment conditions, number of twists, etc., under temporary or permanent tension. In the tires for trucks and buses that have the textile cords in their carcass ply layer with relatively high air pressure therein, the carcass ply cords tend to stretch out. In case steel cords are used for the belt layer, the tires will have a very limited extension in the outward direction. This will cause the tires to expand in the lateral direction absorbing the extension of the carcass ply cords. As a result, the shearing strain in the shoulder portions which are the jointing area of the tread and the side-wall, will increase. In addition, the shoulder portions have the ends of the steel cords of the belt layer, and this has been a major cause for separation. Due to these structural conditions, the shoulder portions are the weakest spot for breakage in the tires.

A variety of experimental tests have been performed to seek out the best conditions for improving the durability of the shoulder portions. The experimental tests have revealed that the durability of the tire depends to a large degree on the width of a tire when inflated with the air pressure of use; more particularly such tire width is determined in proportion to a tread width which does not lower the wear resistance of the tread or to the change of such width of a tire before and after inflation of the tire.

SUMMARY OF THE INVENTION

Accordingly, it is the primary object of this invention to provide a structure for a radial tire for trucks and buses with an improved durability of the shoulder portions without deteriorating the wear resistance of the tread by designing the width of the tire with normal air pressure in conjunction with the width of the tread.

It is another object of this invention to provide a structure for a radial tire for trucks and buses with an improved durability of the shoulder portions by adjusting the increasing rate of the width of the tire; in other words, the diffference in the width of the tire between the times before and after the inflation growth with the air pressure on use.

In keeping with the principles of this invention, the objects are accomplished by unique structural features described hereinbelow.

In this invention, a tread angle is incorporated in expressing the width of the tire to be relative with the width of the tread. The tread angle is set such that the angle is constituted by a line directed from the width-end point of the tread and to the width-end point of the tire and the line directed from the width-end point of the tread in the straight vertical direction. The width-end point is taken such that it is at the 59/100 point of the height of the tire from the edge of the flange of the rim. The tire of this invention is so designed that the tread angle of the tire inflated with the air pressure on use in the tire and the difference in the tread angles between the times before and after the inflation growth with the air pressure on use are within a certain range, thereby improving the durability of the shoulder portions without decreasing the wear resistance of the tread. More specifically, the tires of this invention are so designed that the tread angle $\alpha$ of the tire inflated with the air pressure on use is within $17°\pm3°$ and the difference between the tread angle $\alpha$ and the tread angle $\alpha_0$ with air pressure of 0.5 kg/cm$^2$ before being filled up with air is 3° or less ($\alpha-\alpha_0\leq 3°$).

DETAILED DESCRIPTION OF THE INVENTION

Figure 1A:
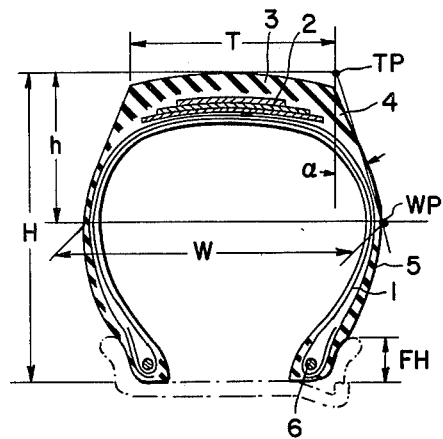
FIGS. 1A, B and C show a cross-sectional view of three different types of radial tires for trucks and buses.
Figure 1B:
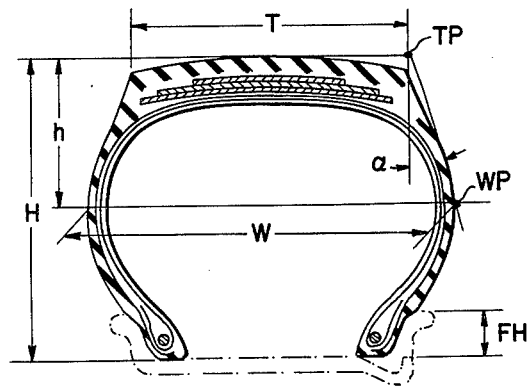
Figure 1C:
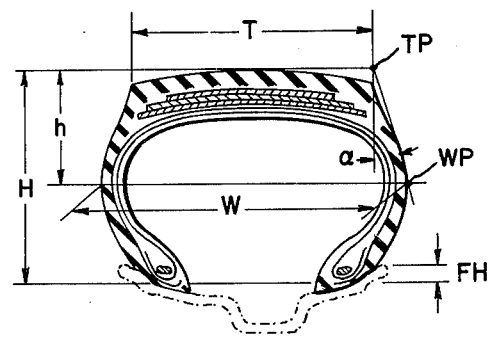

First referring to FIGS. 1A, B and C there are shown three different types of radial tires for trucks and buses with full air pressure. Numeral 1 designates a carcass ply layer having textile cords therein; numeral 2, a belt layer having steel cords therein; numeral 3, a tread; numeral 4, a shoulder portion; numeral 5, a side-wall; numeral 6, a bead core. Symbol H designates height of a tire with full air pressure; W, a width of a tire with full air pressure; T a width of a tread. FIG. 1A shows a cross-sectional view of a radial tire for trucks and buses when the ratio of H to W is about 1.0 (H/W=1.0). FIG. B shows another type where H/W is about 0.8. FIG. 1C shows still another type, where H/W is about 0.7. In the above Figures, the tires of FIG. 1A and B have the same height H but B has a larger width than A. The tires of FIG. 1A and C have the same width W, but A has a larger height than C.

This invention has been developed by closely examining those different types of tires regarding various effects on the durability of the shoulder portions by the relationship between the width W and the height H. The width W is measured at a width-end point of the tire body which is the width of the tire at a point 59/100 of the height H of the tire over the height FH of the flange of a rim; in other words, (H−FH)×0.59=h. In other words, a width-end point of the tire body is that point on the exterior of the tire sidewall which is located at a distance from the top of the tire tread equal to the height of the tire minus the height of the rim multiplied by 0.59. Furthermore, the width-end point of the tread width is located at a point where a vertical line passing through the edge of the tread intersects a line which makes an angle with the vertical line equal to the tread angle α and passes through the width-end point of the tire body.

According to various experiments, it has been noted that those tires, whose tread angle α is small, in other words the width T of the tread 3 is relatively large in relation to the width W of the tire, will have better wear resistance on the tread 3, but will have a shorter life on an edge portion of the belt layer 2, since the shoulder portion 4 has more strain with stress from the ground and tends to cause separation. On the other hand, those tires with their tread angle relatively large, in other words the width T of the tread 3 being relatively small in relation to the width W of the tire have less wear resistance but will have a better quality against separation.

Figure 2:
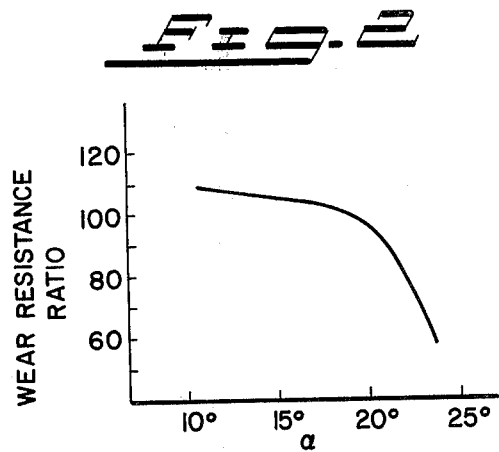
FIG. 2 shows a graphical representation illustrating the relationship between the tread angle with full air pressure and the wearing resistance ratio of the tread.
Figure 3:
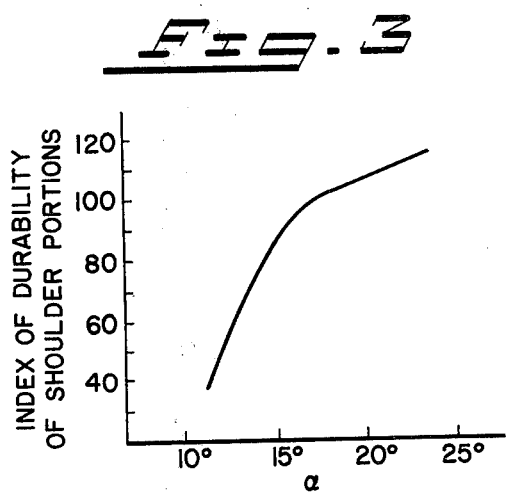
FIG. 3 shows a graphical representation illustrating the relationship between the tread angle and the durability of the shoulder portion under the same condition as in FIG. 2.

FIGS. 2 and 3 show the result of these experiments. FIG. 2 shows a graph representing the relationship between the tread angle α and the wear resistance of the tire with full air pressure. FIG. 3 shows the relationship between the tread angle α and the durability of the shoulder portions. These experiments were conducted by using a "10.00 R20, 14PR" tire, and the numbers were set based upon a standard of 100 which represents the tread angle α being 17°.

Based upon these results it has been observed that the tire will have a very good quality both in connection with the durability of the shoulder portions and the wear resistance of the tread if the tread angle α is within 14°–20° (17°±3°). This condition is applicable to all the types shown in FIG. 1A, B and C.

Figure 4:
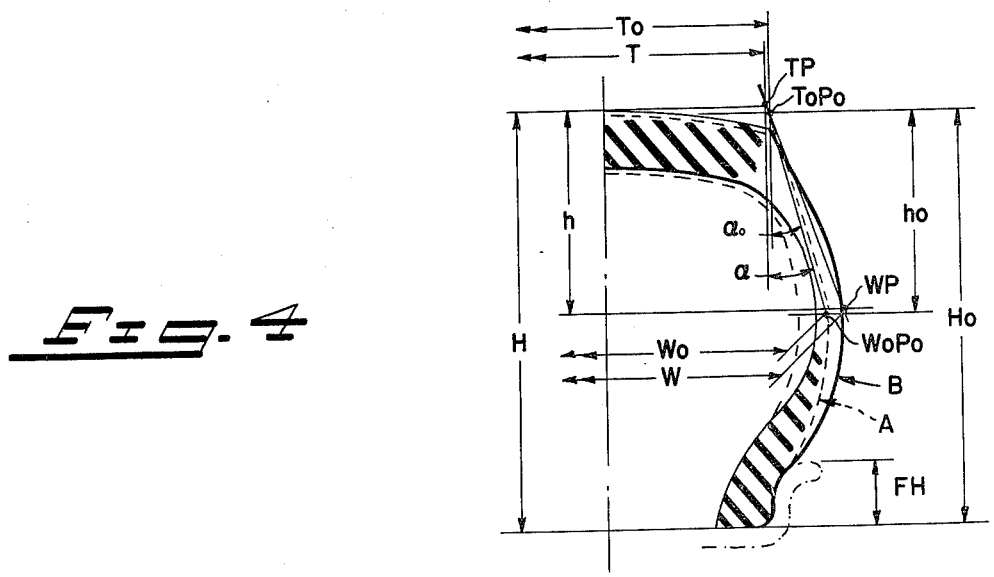
FIG. 4 shows a cross-sectional view of a portion of a tire of this invention with full air pressure in comparison with the same portion before being filled up with air.

Now referring to FIG. 4, which shows the comparison of the configurations of before and after filling up with air, the profile A shown by broken lines represents a configuration with an air pressure of 0.5 kg/cm² before being filled up with air, and the profile B shown by solid lines represents a configuration with full air pressure or 7.25 kg/cm², wherein like reference numerals denote like elements. In FIG. 4, $H_0$ designates the height of the tire, $W_0$ designates the width of the tire, $T_0$ designates the width of the tread, $W_0P_0$ designates a width-end point $W_0$ at $h_0$ point $[h_0=(H_0-FH)\times 0.59]$, $T_0P_0$ designates a width-end point of the width $T_0$, and $\alpha_0$ designates a tread angle formed by a line directed from the point $W_0P_0$ to the point $T_0P_0$ and a line directed from the point $T_0P_0$ in the straight vertical direction.

A series of tests have been conducted by changing both the materials of the textile cords in the carcass layer and the amount of use thereof to examine any changes on the width of the tire and the tread angle before and after the inflation growth of the tire. A drum test has also been conducted under a load of 2,375 kg and at a running speed of 100 km/h. Used in the tests are the tires having the size of 10.00 R20 14 PR and mounted on a rim of 7.50 V×20.

As for the cord materials of the carcass ply layers nylon cords of 1260 D/2 and polyester cords of 1500 D/2 and 1500 D/3 are used for test purpose.

The detailed data of said cords are as follows.

| | | |
|---|---|---|
| Nylon 1260 D/2: | Number of twist | 39 × 39/10cm |
| | Modulus | 300 Kg/mm² |
| | Creep | 6.5% 15 minutes of 3 Kg load Temperature 80° C. |
| Polyester 1500 D/2: | Number of twist | 40 × 40/10cm |
| | Modulus | 770 Kg/mm² |
| | Creep | 4.5% 15 minutes of 3 Kg load Temperature 80° C. |
| 1500 D/3: | Number of twist | 32 × 32/10cm |
| | Modulus | 770 Kg/mm² |
| | Creep | 4.5% 15 minutes of 3 Kg load Temperature 80° C. |

In order to make the properties identical between polyester cords 1500 D/2 and 1500 D/3, the numbers of twist are arranged between them as shown above.

The belt layer comprises, for example, 4 plies structure of steel cords of 7×4×0.38 with the cord end counts of 14/2.5 cm. The steel cords in the first ply counted from the carcass side are disposed at an angle of 55° relative to the circumferential direction of the tire, and the steel cords of the remaining three plies are disposed at an angle of 18° wherein the steel cords of the second ply are disposed in opposite direction to the remaining two plies.

The cord materials of the carcass ply layer and the construction of the belt layer mentioned above are only to exemplify an embodiment for a tire construction generally employed in the arts.

The results of the tests are as shown in the following table.

| | Carcass ply layer | Carcass strength (Kg/2.5 cm) | Tire width (mm) | | Tread angle | | Changes | Durability | |
| | | | $W_0$ | W (increasing rate) | $\alpha_0$ | α | (α−α₀) | Running distance (Km) | if any |
|---|---|---|---|---|---|---|---|---|---|
| A | Nylon 1260D/2 4 plies | 1442 | 252 | 282 (1.12) | 13.7 | 19.5 | 5.8 | 1230 | Separation at the edge of belt layer |
| B | Nylon 1260D/2 6 plies | 2334 | 252 | 279 (1.11) | 13.7 | 19.0 | 5.3 | 1580 | Separation at the edge of belt layer |
| C | Nylon 1260D/2 6 plies | 2334 | 266 | 2.85 (1.07) | 16.5 | 20.1 | 3.6 | 7050 | Separation at the edge of belt layer |
| D | Nylon 1260D/2 6 plies | 2334 | 275 | 289 (1.05) | 18.5 | 21.1 | 2.6 | 6300 | Separation at the edge of belt layer |
| | Polyester | | | | | | | | Separation |

-continued

| | | | Type of tests | | | | | |
|---|---|---|---|---|---|---|---|---|
| | | | Tire width (mm) | | | | Durability | |
| | Carcass ply layer | Carcass strength (Kg/2.5 cm) | Wo | W (increasing rate) | Tread angle $\alpha_0$ | $\alpha$ | Changes $(\alpha-\alpha_0)$ | Running distance (Km) | if any |
| E | 1500D/2 4 plies Polyester | 1502 | 250 | 267 (1.07) | 13.3 | 17.7 | 3.4 | 2750 | at the edge of belt layer |
| F | 1500D/2 5 plies Polyester | 1878 | 250 | 264 (1.06) | 13.3 | 16.1 | 2.8 | 10000 | no damages |
| G | 1500D/2 4 plies Polyester | 1502 | 263 | 275 (1.05) | 15.9 | 18.2 | 2.3 | 10000 | no damages |
| H | 1500D/3 3 plies | 1596 | 263 | 273 (1.04) | 15.9 | 17.8 | 1.9 | 10000 | no damages |

Wo is the tire width with 0.5 Kg/cm² pressure.
W is the tire width with 7.5 Kg/cm² pressure.
$\alpha_0$ is the initial tread angle and $\alpha$ is a tread angle after inflation.

The tread angle ($\alpha$) of tire A inflated with the air pressure on use, i.e. 7.5 Kg/cm² air pressure is within the range of 17°±3°, but the difference of the tread angle ($\alpha-\alpha_0$) before and after the inflation growth exceeds 3°. As a result, the durability of the shoulder portion is not satisfactory.

In tire B, the amount of use of Nylon cords is changed, while the initial tire width basing upon the width of a vulcanizing mold is the same with that in tire A. The tread angle ($\alpha$) is also within the range of 17°±3°, but the difference of the tread angle ($\alpha-\alpha_0$) still exceeds 3° despite that the use amount is increased in comparison with tire A. The result is not preferable too.

In tire C, the initial tire width is changed under the same amount of use with tire B. The tread angle ($\alpha$) is out of the range of 17°±3° and also the difference ($\alpha-\alpha_0$) exceeds 3°. Unpreferable result is obtained.

In tire D, the initial tire width is more increased than tire C under the same amount of use with tire C. The difference ($\alpha-\alpha_0$) can be restrained within the range of 3°, but the tread angle ($\alpha$) is out of the range of 17°±3°. The result is also unpreferable.

In addition, in tires B, C and D, the strength of carcass ply is in excess of that required since a preferable strength is generally about 1500 Kg/2.5 cm plus or minus 300 Kg/2.5 cm according to a manufacturer.

Tire E contains a carcass ply layer made of Polyester cords 1500 D/2, 4 plies, and the initial tire width thereof is similar to those of tires A and B. According to the difference of modulus between Nylon cords and Polyester cords, the values of tread angle ($\alpha$) and the difference ($\alpha-\alpha_0$) are reduced compared with those of tires A and B. The tread angle ($\alpha$) falls within the range of 17°±3°, but the difference ($\alpha-\alpha_0$) exceeds 3°. So the result is not good.

In tire F, the initial tire width is the same with tire E, but the amount of use is increased compared with Tire E. The tread angle ($\alpha$) falls within the range of 17°±3° and the difference ($\alpha-\alpha_0$) also falls not more than 3°. As a result, there is obtained a good result in durability of the tire.

In tire G, the amount of use of Polyester cords is reduced, while the initial tire width is increased, compared with that of tire F respectively. Such a construction can also attain a good result as shown in the table.

Tire H contains different Polyester cords and different number of plies from those of tire G. The initial tire width is the same with that of tire G. Such a construction also falls within the range of 17°±3° and not more than 3° with respect to the tread angle ($\alpha$) and the difference ($\alpha-\alpha_0$) respectively, and there is obtained a good result in durability.

The above results of tests show that it substantially depends upon the combination among the cord material, the amount of use thereof and the initial tire width to determine the value of tread angle ($\alpha$) and the value of tread angle ($\alpha-\alpha$).

It can be also observed that the tire construction which falls within the range of 17°±3° as to the tread angle ($\alpha$) and also falls not more than 3° as to the difference ($\alpha-\alpha_0$) can only attain a good result in durability.

Accordingly, the feature of the present invention is to construct the tire so as to satisfy the conditions of 17°±3° as to the tread angle ($\alpha$) and not more than 3° as to the difference of the tread angle ($\alpha-\alpha_0$) by selecting preferable combinations among the cord material, the amount of use and the initial tread width, so that a good durability is obtained in the shoulder portion of the tire.

I claim:

1. A radial tire for trucks and buses including a carcass ply layer of textile cords and a belt layer of steel cords characterized in that said radial tire is so constructed to have a tread angle of 17° plus or minus 3° when inflated with an air pressure of use, said tread angle being formed by a line directed from a width-end point of a tread to a width-end point of a tire body and a line directed from a width-end point of the tread in a straight vertical direction; and to have a tread angle change of not more than 3° before and after inflation of the tire with full pressure.

* * * * *